United States Patent
Manzel et al.

(10) Patent No.: US 6,320,925 B1
(45) Date of Patent: Nov. 20, 2001

(54) SPACE FOR A FUEL ASSEMBLY OF A NUCLEAR POWER STATION

(75) Inventors: Reiner Manzel; Werner Jahreiss, both of Nürnberg; Norbert Schmidt, Coburg; Josef Steven, Neunkirchen am Brand; Peter Dewes, Erlangen; Friedrich Garzarolli, Höchstadt; Erhard Ortlieb, Kalchreuth; Franz-Josef Bökers, Fürth; Matthias Rudolph, Weisendorf, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/238,857

(22) Filed: Jan. 27, 1999

(30) Foreign Application Priority Data

| Jan. 27, 1998 | (DE) | 298 01 286 U |
| Dec. 4, 1998 | (DE) | 298 21 676 U |
| Dec. 10, 1998 | (DE) | 198 57 086 |

(51) Int. Cl.$^7$ .................................................. G21C 3/352
(52) U.S. Cl. ..................... 376/438; 376/434; 376/442; 376/448; 376/462
(58) Field of Search ............................. 376/448, 444, 376/434, 261, 443, 442, 438, 439, 462, 437

(56) References Cited

U.S. PATENT DOCUMENTS

| 3,665,586 | * | 5/1972 | Jabsen | 29/428 |
| 3,933,583 | | 1/1976 | Jabsen . | |
| 4,090,918 | | 5/1978 | Masetti . | |
| 4,124,444 | | 11/1978 | Jabsen . | |
| 4,163,690 | * | 8/1979 | Jabsen | 176/78 |
| 4,725,402 | * | 2/1988 | Krawiec | 376/438 |
| 4,803,043 | * | 2/1989 | DeMario et al. | 376/442 |
| 5,139,736 | * | 8/1992 | Bryan | 376/442 |
| 5,188,797 | * | 2/1993 | Bryan | 376/438 |
| 5,299,245 | * | 3/1994 | Aldrich et al. | 376/439 |
| 5,402,457 | * | 3/1995 | Suchy et al. | 376/443 |

FOREIGN PATENT DOCUMENTS

| 543 158 | 11/1973 | (CH) . |
| 2 260 593 | 7/1973 | (DE) . |
| 2 400 800 | 7/1974 | (DE) . |
| 25 50 932 B2 | 6/1981 | (DE) . |
| 29 18 112 B2 | 7/1981 | (DE) . |
| 0 527 244 B1 | 2/1993 | (EP) . |

* cited by examiner

Primary Examiner—Michael J. Carone
Assistant Examiner—John Richardson
(74) Attorney, Agent, or Firm—Herbert L. Lerner; Laurence A. Greenberg; Werner H. Stemer

(57) ABSTRACT

A spacer of a fuel assembly having intersecting webs undergoes reduced longitudinal expansion as a result of corrosion during an operating period. The webs have intersection locations at which assembly gaps are provided. The assembly gaps have widths which correspond essentially, at most over a fraction of their total length, to the wall thickness of an intersecting web, but are wider in a remaining region. Since corrosion layers growing from an edge of an assembly gap toward the intersecting web cannot touch the web, no solid pressure, which could lead to longitudinal expansion, builds up.

13 Claims, 10 Drawing Sheets

SPACE FOR A FUEL ASSEMBLY OF A NUCLEAR POWER STATION

BACKGROUND OF THE INVENTION

FIELD OF THE INVENTION

The invention relates to a spacer for a fuel assembly of a nuclear power station, in particular for a fuel assembly of a light water reactor.

Spacers are used for fixing fuel rods in a fuel assembly. A spacer forms a matrix of intersecting webs and a base area covered by the spacer corresponds essentially to the cross sectional area of the fuel assembly. Each web has an assembly gap which is disposed at an intersection location with an intersecting web and receives the intersecting web. The webs which are guided in the assembly gaps and subsequently fixed, for example by welding, form cells having an essentially rectangular or square base area. The fuel rods, as well as guide tubes in the case of pressurized water fuel assemblies and possibly water rods in the case of boiling water fuel assemblies, project through the cells formed by the spacer and are held there. In other words, they are fixed in their position relative to the center axis of the fuel assembly.

In certain circumstances, under the operating conditions in the core of the nuclear reactor, the spacers of a fuel assembly may undergo longitudinal expansion which may lead to an increase in the external dimensions of the spacers and consequently of the fuel assembly. In an extreme case, the result of the increase in the external dimensions may be that a fuel rod bundle formed by the spacer can no longer be removed from a fuel assembly box, for example in the case of a fuel assembly for a boiling water reactor.

In the case of fuel assemblies of pressurized water reactors, the longitudinal expansion of the spacers is unusually high. The increase in the external dimensions may cause complications with the adjacent fuel assemblies during servicing work and during loading and unloading of the reactor core.

SUMMARY OF THE INVENTION

It is accordingly an object of the invention to provide a spacer for a fuel assembly of a nuclear power station, which overcomes the heretofore-mentioned disadvantages of the heretofore-known devices of this general type and which undergoes insignificant longitudinal expansion during an operating period.

With the foregoing and other objects in view there is provided, in accordance with the invention, a spacer for a fuel assembly of a nuclear power station, comprising webs disposed in a grid defining intersection locations, each of the webs having a wall thickness and having an assembly gap receiving an intersecting web at one of the intersection locations; the assembly gap in each of the webs having regions through which parts of the other of the webs pass in the intersection location of two webs, at least two of the regions having different widths; and the assembly gap in each of the webs having a total length formed by the regions through which the parts of the other of the webs pass in the intersection location of two webs, at most a fraction of the total length having a width substantially corresponding to the wall thickness of the other of the webs.

Therefore, the assembly gap has a width, at most over a fraction of its total length, which corresponds essentially to the wall thickness of the intersecting web, but in a remaining region is wider than the wall thickness of the intersecting web.

The invention proceeds from the knowledge that, under normal operating conditions, the longitudinal expansion of a spacer may be caused by corrosion of the spacer. A corrosion layer may form on the web wall in the assembly gap, particularly at assembly gaps of a spacer web formed of a zirconium alloy, for example, a Zircalloy plate. In order to achieve a high accuracy of fit of the spacer composed of the webs, the assembly gaps have heretofore been dimensioned in such a way that their width corresponds essentially to the wall thickness of the intersecting web. With that structure of the spacer, there is the risk that the corrosion layers, which grow toward one another from the edges of the assembly gaps and from the surface of the inserted web, will meet one another before the end of the period of use. The corrosion layers then exert a solid pressure on the respective web which may lead to a lengthening of the web.

Since each web has a multiplicity of assembly gaps with corrosion-endangered regions, the resulting total longitudinal expansion of the webs may become so great that the change in the external dimension of the spacer exceeds a critical value. Moreover, a varying longitudinal expansion of different webs may lead to the warping of individual webs and/or of parts of the spacer, thus adversely influencing the flow properties of the spacer.

The invention proceeds, then, from the notion of reducing the solid pressure exerted on a web by the corrosion layers.

According to the invention this is achieved, on one hand, in such a way that the assembly gaps of two webs which are provided at an intersection location with another web, have a width only over a fraction of their total length, through which parts of a web pass in each case, that corresponds to the wall thickness of the intersecting web. By virtue of the reduced bearing surface between the edges of the assembly gaps and the intersecting webs, the solid pressure on the web decreases, thus resulting in a considerable reduction in the undesirable longitudinal expansion of the web. The length of the regions in which the width of the assembly gap corresponds essentially to the wall thickness of the intersecting web is selected in such a way that the spacer matrix has a strength which is sufficient for subsequent machining steps, such as, for example, the welding of the webs at the intersection locations, and for the loads which occur under operating conditions. This affords the advantage of ensuring that, after the webs have been welded together, the assembly gaps do not have to be widened in an additional operation, for example by pickling or corroding, in order to reduce the solid pressure on the web which occurs as a result of corrosion.

In accordance with another feature of the invention, each web has a recess on at least one side of each assembly gap, in the region of the narrowest cross section of the latter, wherein the recess is adjacent the assembly gap. This affords the advantage of permitting web deformation caused by corrosion in the region of the narrowest cross section of the assembly gap to be absorbed by the recess. The solid pressure on the remaining part of the web can thereby be further reduced.

If the web is to have only minimal longitudinal expansion due to corrosion, without an additional recess, the width of the assembly gap is dimensioned, virtually over its entire length, to be greater than the wall thickness of the intersecting web. In order to acquire the necessary stability of the spacer matrix formed from the webs, the assembly gap has only a few (but at least three) support locations along its axis or principal extent, for example bearing points or bearing regions, at which the assembly gap touches the intersecting web. The support locations are disposed on both sides of each assembly gap, in such a way that the intersecting web is supported in each case on only one side over a sufficiently small area. The advantage of this is that a solid pressure may build up at the few support locations during the operating period and could partially deform the intersecting web transversely to its direction of principal extent, and consequently only some of the solid pressure contributes to the longitudinal expansion of the web.

In accordance with a further feature of the invention, a further reduction in the solid pressure leading to longitudinal expansion is achieved through the use of apertures in the middle of the web. Preferably, each web has at least one aperture disposed on an assembly axis of each assembly gap. Advantageously, each assembly gap opens in each case into at least one of the apertures. Thus, corrosion-endangered locations in the web are cut out and, moreover, it becomes possible to have a sufficient cooling water stream for the regions of the spacer which are located in the vicinity of an intersection location, so that corrosion is retarded there.

In accordance with an added feature of the invention, there are provided firm connections between the webs, through the use of which a stabilization of the spacer is achieved. Lengthening of the web is prevented by such a firm connection of the intersecting webs at a connection location, preferably through the use of a metallurgical connection, for example through the use of a weld spot in the intersection region. Moreover, metallurgical connections often undergo a lesser degree of corrosion than the untreated material. Such metallurgical connections may, for example, fill those regions in the assembly gap which would be particularly in danger of corrosion.

In accordance with an additional feature of the invention, particularly in pressurized water reactors, it has proved particularly appropriate to have spacers with webs which contain at least two web plates bearing against one another at least in the region of an intersection location with an intersecting web. The common or combined thickness of these web plates at the intersection location corresponds to the wall thickness of the web. In the regions outside an intersection location, the web plates may be deformed and/or bent relative to one another so that, for example, flow ducts are obtained between them. In the case of spacers in fuel assemblies for pressurized water reactors, there is therefore a series of further locations, in addition to the assembly gaps, at which the webs or the web plates touch one another. There are, in part, regions in which the webs, in particular the web plates, bear against one another over a large area. For the reasons already explained with regard to the assembly gaps, these regions are likewise preferred regions for corrosion and/or for the formation of corrosion lenses and may cause deformation of the spacers.

In accordance with yet another feature of the invention, consequently, in the case of the webs formed of a plurality of web plates, it is advantageous to connect the web plates which are located next to one another metallurgically to one another, in particular in the region of the intersection location of the webs.

In accordance with yet a further feature of the invention, the web plates located next to one another are connected, preferably metallurgically connected, to the intersecting web at least at one connection location. The web plates may be connected to one another over a large area at least at one further connection location, preferably in a region in which they bear against one another. The latter is achieved, in particular, by welding at the locations at which the web plates bear against one another over a large area. This may be carried out, for example, when the webs are assembled to form the gridlike spacer. The web plates have expediently already been previously assembled to form webs.

In accordance with yet an added feature of the invention, corrosion-endangered locations are avoided if each web is firmly connected, preferably metallurgically connected, to the other web virtually along the entire length of that part of each assembly gap having a width which corresponds essentially to the wall thickness of the other web. This results in long welds which are applied preferably along the narrower region or narrower regions of the assembly gaps by laser beam welding. With regard to the spatial conditions in the spacer, a longer run of the weld seam along the assembly gaps is possible as a result of laser beam welding, as compared with electron beam welding.

Moreover, regions in danger of corrosion are those at which the webs and/or the web plates are bent. This relates, in particular, to regions with small bending radii. The cause of this is possibly the reduced cooling water stream in such regions, as compared with regions which have no bending radii. At those endangered locations and/or regions as well, for the reasons mentioned above, corrosion layers may exert a solid pressure on the respective web that may lead to a lengthening of the web. Making recesses, apertures or firm connections at such corrosion-endangered locations effectively prevents the longitudinal expansion of spacers, since a sufficient cooling water stream is ensured once again. In particular, such apertures may also be produced through the use of a bead or a groove. This preferably also relates to further apertures or recesses in the webs and/or web plates along an assembly axis of each assembly gap. In particular, this also relates to further connection locations which connect the web plates to one another, in particular metallurgically to one another, over a large area.

In accordance with yet an additional feature of the invention, that part of a web which passes through an assembly gap of another web carries two elevations, between which the other web is held. These elevations fix the intersecting webs before they are firmly connected to one another, for example through the use of weld spots or weld seams.

With the objects of the invention in view, there is also provided a spacer for a fuel assembly of a nuclear power station, comprising webs disposed in a grid defining intersection locations, each of the webs having an assembly gap receiving an intersecting web at one of the intersection locations; each assembly gap of each web including one region having a metallurgical connection of two webs in the intersection location of two webs; and each assembly gap of each web including another region in the intersection location of two webs through which part of the other web passes, the other region having a width sufficient to prevent two webs from touching.

With the objects of the invention in view, there is additionally provided a spacer for a fuel assembly of a nuclear power station, comprising two mutually parallel first outer strips; two mutually parallel second outer strips perpendicularly to the first outer strips; first webs standing on edge, parallel to the first outer strips and having ends each engaging into and fixed to a respective one of the outer strips; second webs standing on edge, parallel to the second outer strips, intersecting the first webs and having ends each engaging into and fixed to a respective one of the outer strips; the first webs each having an upper edge and a lower edge, the upper edges running from one of the outer strips to another of the outer strips and each having an assembly gap at an intersection location with a respective one of the second webs, the assembly gap directed toward the lower edge and receiving part of an intersecting one of the second webs; the second webs each having an upper edge and a lower edge, the lower edges each having an assembly gap at an intersection location with a respective one of the first webs, the assembly gap directed toward the upper edge and receiving part of an intersecting one of the first webs; each of the assembly gaps closed at one of the edges of each of the webs by a metallurgical connection of one web with an intersecting web; and each of the assembly gaps having a region through which part of the intersecting web passes, the region wide enough to prevent two of the webs from touching.

Other features which are considered as characteristic for the invention are set forth in the appended claims.

Although the invention is illustrated and described herein as embodied in a spacer for a fuel assembly of a nuclear power station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
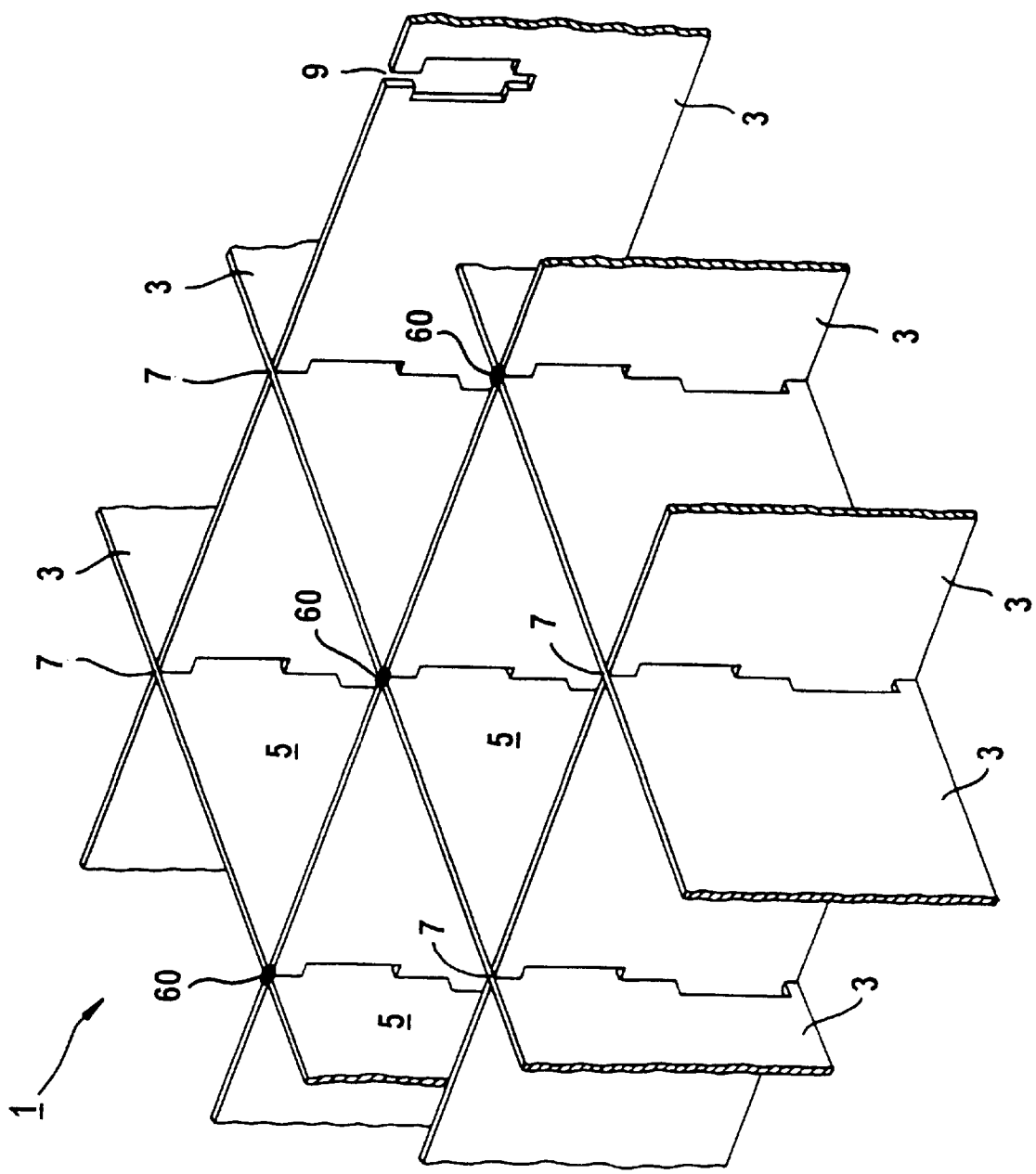
FIG. 1 is a fragmentary, diagrammatic, perspective view of a spacer matrix formed from intersecting webs.

Referring now in detail to the figures of the drawings, in which identical elements bear the same reference symbols, and first, particularly, to FIG. 1 thereof, there is seen a portion of a spacer 1 of a fuel assembly, th e remainder of which is not illustrated. The spacer 1 is constructed as a matrix which is formed from a plurality of intersecting webs 3. These intersecting webs 3 form cells 5 having an essentially square base area, through which non-illustrated fuel rods of the fuel assembly project. The cells 5 of the spacer matrix 1 surround the outer circumference of the fuel rods which are thus held in their position relative to a longitudinal axis of the fuel assembly. For this purpose, as a rule the webs carry bosses, springs or other auxiliary members which engage the fuel rods. Such known engagement aids, in particular springs 54 and bosses 56, are illustrated once in FIG. 13 as an example for the other figures in which they are omitted. In the present exemplary embodiment, the spacer matrix 1 is formed by two groups of identical intersecting parallel webs. Each web of one group intersects each web of the other group at right angles at precisely one intersection location or point 7. Each web 3 has an assembly gap 9 which is disposed at an intersection location 7 and receives part of a wall of the respectively intersecting web. Moreover, a metallurgical connection 60 of the intersecting webs is made in the vicinity or region of the intersection location 7. As a rule, these connections are welded connections. However, other connections may also be envisaged, which fix the intersecting webs closely to one another. The firm connections are preferably made in each case in the vicinity or region of the intersection location at an upper edge of the spacer matrix standing on edge and correspondingly at a lower edge of the spacer matrix standing on edge. However, the metallurgical connections are advantageously not restricted only to the edge of the spacer matrix. The connections are also advantageously continued virtually along the entire length of that part of each assembly gap having a width which corresponds essentially to the wall thickness of the other web.

Figure 2:
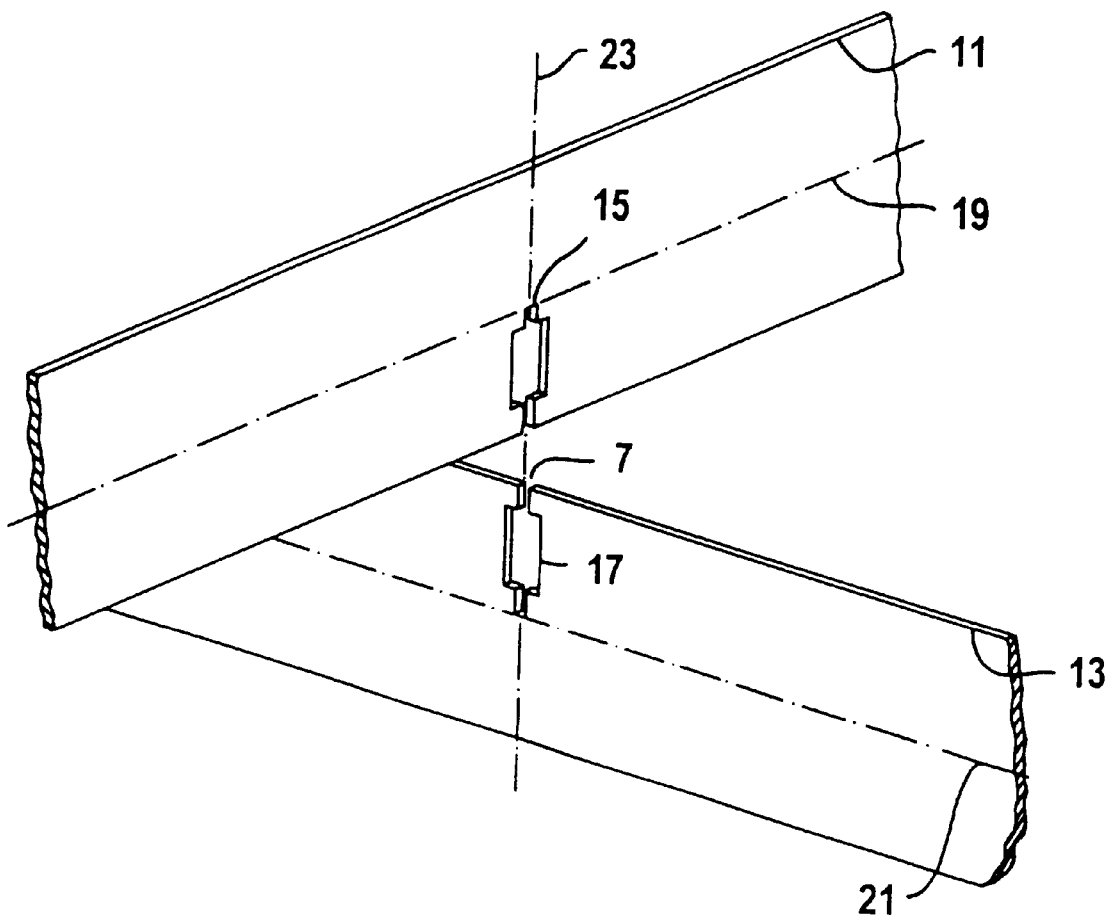
FIG. 2 is a fragmentary, perspective view showing a portion of two intersecting webs with assembly gaps from a spacer matrix.

FIG. 2 illustrates two intersecting webs 11, 13 with their associated assembly gaps 15, 17 and with their intersection location 7. For greater clarity, the intersecting webs 11, 13 are shown in the state prior to assembly. The upper web 11 having a center axis 19 is taken from the first group of webs and the lower web 13 having a center axis 21 is taken from the second group. The webs 11, 13 are assembled along an assembly axis 23 which is perpendicular to the two center axes 19, 21. The assembly gap 15 of the upper web 11 extends along the assembly axis 23 from the center axis 19 as far as the lower edge of the upper web 11, while the assembly gap 17 of the lower web 13 runs similarly from the center axis 21 toward the upper edge of the web 13 in the opposite direction. If the two webs 11, 13 are assembled along the assembly axis 23, each of the assembly gaps 15, 17 in each case receives part of the wall of the intersecting web. The total height of the spacer matrix 1 which is thus formed then corresponds to the width of the individual webs 11, 13.

Figure 3:
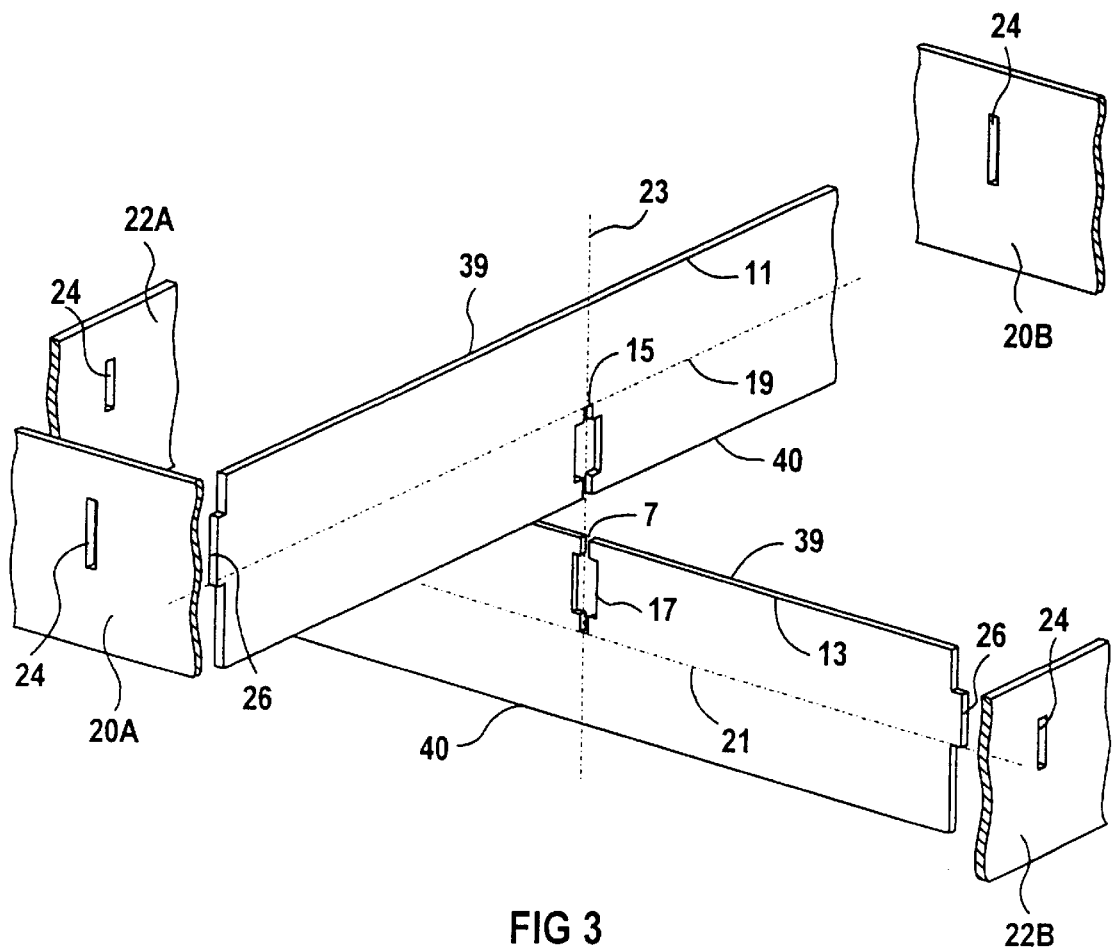
FIG. 3 is a fragmentary, perspective view showing a portion of two intersecting webs with fastenings between the webs and an outer strip of a spacer according to the invention.

FIG. 3 shows a portion of a spacer provided for a fuel assembly of a nuclear power station, with two mutually parallel first outer strips 20A, 20B and two mutually parallel second outer strips 22A, 22B that are disposed perpendicularly to the first outer strips 20A, 20B. The spacer also has first webs 13 standing on edge and disposed parallel to the first outer strips 20A, 20B and second webs 11 standing on edge, disposed parallel to the second outer strips 22A, 22B and intersecting the first webs 13.

In this case, the stated object is achieved, according to the invention, in such a way that:

a) each end of each web in each case engages into an outer strip 20A, 20B, 22A, 22B and is fixed there;

b) th e first webs 13 have an upper edge 39 running from one outer strip 22A to the other outer strip 22B with an assembly gap 17 that is disposed at an intersection location 7 with a second web 11, is directed toward a lower edge 40 and through which part of an intersecting second web 11 passes;

c) the second webs 11 each have an assembly gap 15 which is disposed at their corresponding lower edge 40 at an intersection location 7 with a first web 13, is directed toward their upper edge 39 and through which part of an intersecting first web 13 passes;

d) each assembly gap 15, 17 is closed at the edge of each web through the use of a metallurgical connection 60 of the web (see FIGS. 1 and 12) with the intersecting web; and e) each assembly gap 17 has a region 30 (see FIG. 13) through which part of the intersecting web passes and which is so wide that the two webs do not touch one another.

In FIG. 3, each end of each web has a latch 26 each engaging into a slot 24 in a respective outer strip and preferably being welded there.

Figure 4:
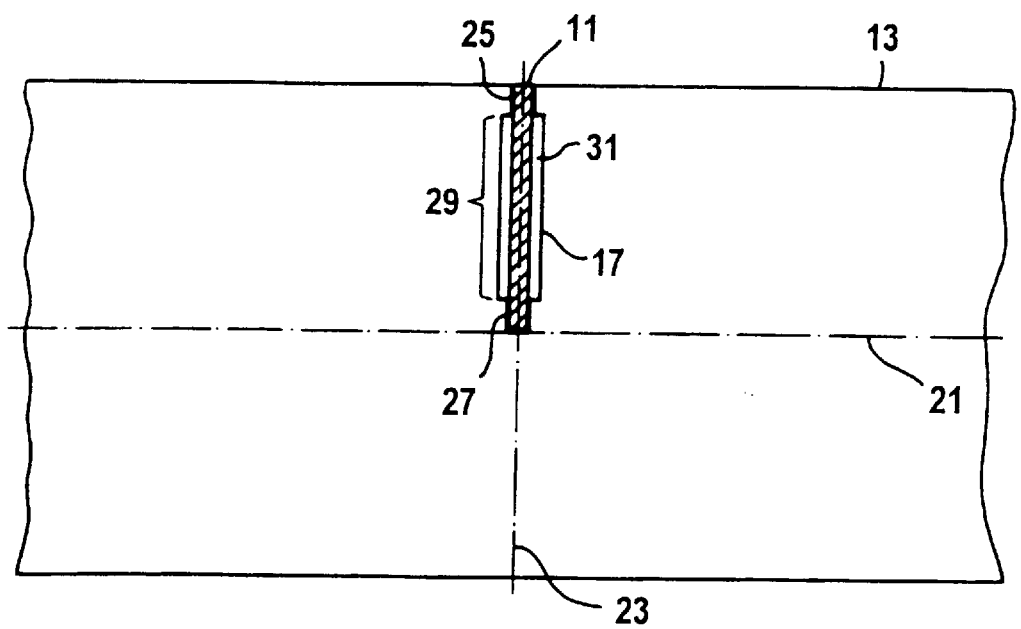
FIG. 4 is a fragmentary, elevational view showing a web with an assembly gap having support locations located opposite one another.

FIG. 4 shows a side view of the web 13 after it has been assembled together with the web 11. The assembly gap 17 has received the wall of the web 11 along the assembly axis 23. The assembly gap 17 has a width in the vicinity of its upper and lower end or regions 25, 27 which corresponds to the wall thickness of the intersecting web 11, as well as a greater width in a region 29 between the ends 25, 27. A gap 31 is thus formed between the edge of the assembly gap 17 and the wall of the web 11 on both sides of the assembly axis. The width of the gap 31 is selected in such a way that corrosion layers, which occur at the edge of the assembly gap 17 and the wall of the intersecting web 11 and continually reduce the size of the gap 31 during operation, cannot completely clog this gap 31 over the entire operating period of the spacer. This prevents the possibility of an undesirable solid pressure building up on the web 13 outside the end regions 25, 27 of the assembly gap 17.

Figure 5:
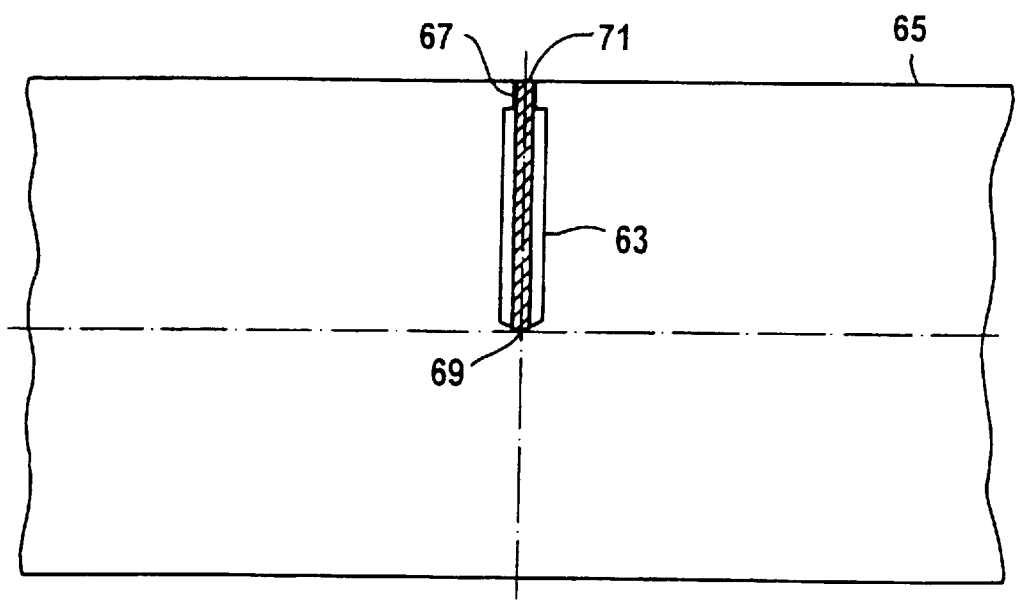
FIG. 5 is a view similar to FIG. 4 showing a web with an assembly gap having a V-shaped end.

FIG. 5 shows a modified embodiment of the web 13 illustrated in one of FIGS. 2 to 4. The position and extent of an assembly gap 63 of a web 65 correspond to the structures shown in FIGS. 2 to 4. As in FIG. 4, the assembly gap 63 has a width in the vicinity of its upper end 67 which corresponds to the wall thickness of an intersecting web 71. The assembly gap tapers in a V-shaped manner in the vicinity of its lower end 69. In this region, the wall of the intersecting web 71 is likewise integrally formed in a V-shaped manner and engages, in the same way as in a knife-edge bearing, in the V-shaped end of the assembly gap 69. As a result, this end of the wall of the intersecting web 17 is fixed. The solid pressure possibly occurring in this region as a result of corrosion is greatly reduced due to the small bearing surface.

Figure 6:
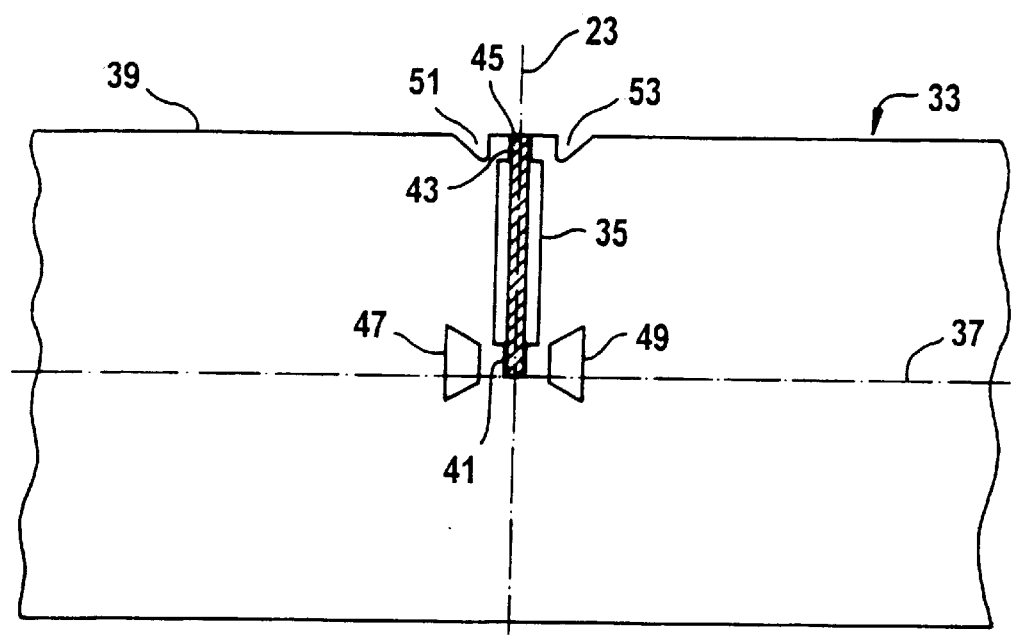
FIG. 6 is a view similar to FIG. 4 showing a web with an assembly gap and with recesses disposed on both sides of the assembly gap.

FIG. 6 shows a further embodiment of a web 33. An assembly gap 35 extends from a center axis 37 along the assembly axis 23 as far as the upper edge 39 of the web 33. As in the exemplary embodiment shown in FIG. 4, the assembly gap 35 has a width in the vicinity of its lower and upper ends 41, 43 which corresponds essentially to the wall thickness of an intersecting web 45. In a remaining region, the assembly gap 35 is constructed to be widened in a similar way to the assembly gap 17 in FIG. 3. In order to reduce the longitudinal expansion of the web 33 occurring as a result of corrosion in the region of the lower end 41 of the assembly gap 35, two recesses 47, 49 are provided in this region on both sides of the assembly gap 35. These recesses 47, 49 absorb the deformation of the web 33 caused by a change in length. Two indentations 51, 53 are provided on both sides in the region of the upper end 43 of the assembly gap 35 and absorb undesirable longitudinal expansion in this region in a similar way to the recesses 47, 49.

Figure 7:
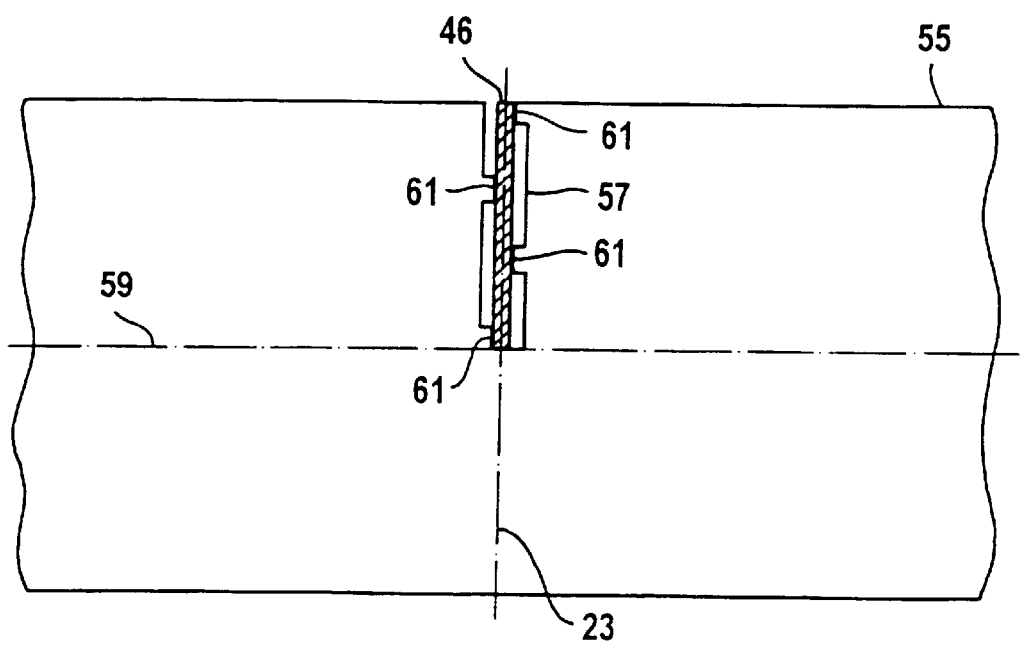
FIG. 7 is a view similar to FIG. 4 showing a web with an assembly gap having four support locations not located opposite one another.

FIG. 7 illustrates a further embodiment of a web 55 of a spacer. In contrast to the preceding exemplary embodiments, an assembly gap 57 extending along the assembly axis 23 from a center axis 59 upward does not have a region at which its width corresponds essentially to the wall thickness of an intersecting web 46. The assembly gap 57 is constructed in such a way that an edge thereof touches the wall of the intersecting web 46 at a support location 61, in each case on only one side of the assembly axis 23. In contrast, an edge of the assembly gap 57 which is located opposite the support location 61 does not touch the wall of the intersecting web 46. Altogether, two support locations 61 are provided on each of the two sides of the assembly axis. The support locations in each case alternately touch one side of the wall of the intersecting web and thus fix the latter in its position in the assembly gap 57.

The structure of the assembly gaps in these exemplary embodiments minimizes the contact surface of the two intersecting webs at the intersection location, in such a way that a stable connection of the two webs engaging one into the other is still ensured. Nevertheless, there is sufficient space outside the contact regions, so that corrosion of the webs in the assembly gap does not lead to deformations and growth of the webs. In this case, the term "assembly gap" refers only to those regions of a gap in a web through which parts of the other web pass. However, in cases in which the assembly gap opens into a wide aperture in the web, solid parts of the other web do not pass through this aperture. In other words, the assembly gap terminates where it opens into the aperture.

Such apertures have sometimes been provided in the prior art for other reasons. Thus, the intersecting webs of the spacer according to German Published, Prosecuted Patent Application DE 25 50 932 B2 possess a middle region between their upper edge and their lower edge. The middle region is curved into grid meshes of the grid-like spacer and carries bosses on which the fuel rods are supported. In order to ensure that those curved webs can be inserted one into the other, the middle regions of two webs carry an aperture in each case at the intersection location. No solid parts of the webs pass through one another in the region of those two middle parts, but instead a common orifice is obtained in the two webs. Consequently, in one of the two webs, the assembly gap leads from the upper edge of one web as far as this aperture, while the other web has an assembly gap which reaches from the lower edge of the other web as far as this aperture.

Similar apertures, which form a common orifice passing through both webs at the intersection location of two webs, are also provided in U.S. Pat. Nos. 3,933,583 and 4,124,444. Outside those apertures, which perform a particular function, the intersecting webs possess assembly gaps having a uniform width which is virtually equal to the wall thickness of the webs and therefore does not prevent the webs from being spread and experiencing a growth in length as a result of corrosion taking place in the assembly gap.

Figure 8:
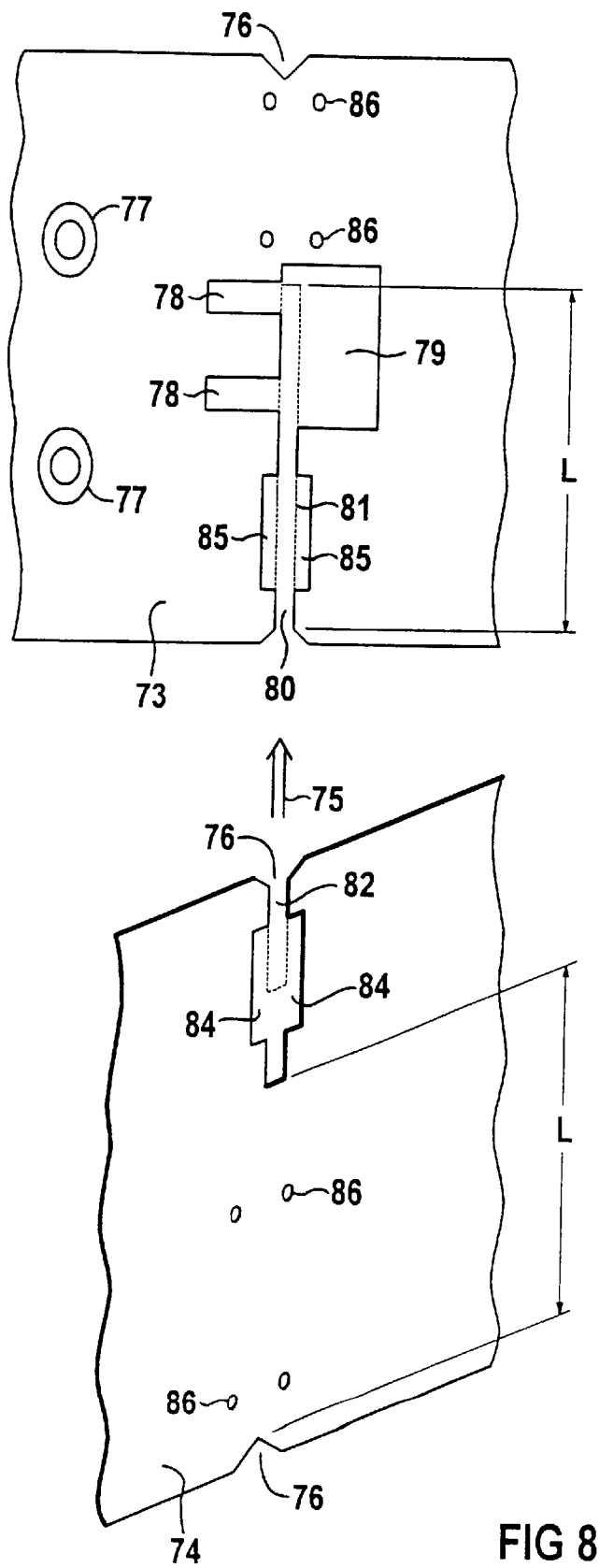
FIG. 8 is a fragmentary, exploded view showing two webs of another exemplary embodiment at a location of their intersection location.

Assembly gaps, which are associated with apertures provided for the use of bosses and springs for supporting the fuel rods, are also known from European Patent 0 527 244 B1. There, a web carries two apertures which are disposed on one side of the assembly gap and in which profiled ends of an inserted supporting spring are held. In order to ensure that those profiled spring ends can be inserted, a larger orifice of the web is provided on the other side of the assembly gap. In that case, the ends of the spring are inserted first of all into the larger apertures and are then pushed into the two apertures beyond the assembly gap on the other side of the latter and interlocked by the two webs being inserted one into the other. Therefore, in that prior art, only one web carries an assembly gap with apertures, while the assembly gap of the other web has a uniform width at that intersection location. FIG. 8 shows that, in that case too, a variable width of both assembly gaps is advantageous.

FIG. 8 shows two webs 73, 74, before they are inserted one into the other in the direction of an arrow 75 and connected metallurgically to one another. In this case, upper edges and lower edges of the two webs each carry indentations 76 which can receive appropriate soldering material or welding material during metallurgical connection. Furthermore, bosses 77, which serve for fixing a fuel rod laterally together with a non-illustrated spring supported on the opposite web, are shown on the web 73.

Such a non-illustrated supporting spring is held with its profiled ends at corresponding apertures 78 on one side of an assembly gap 80 of the web 73. A larger mounting aperture 79 is located on the other side of the assembly gap 80. During the mounting operation, spring ends which are first inserted into the mounting aperture 79 are pushed laterally into the apertures 78 beyond the gap 80 and are interlocked there as soon as corresponding parts of the web 74 are introduced into the assembly gap 80. These parts of the web 74 which are introduced into the assembly gap 80 and, after mounting, pass through the latter, are illustrated on the web 73 by a broken contour 81. In this case, the total length of the assembly gap 80 is illustrated by reference symbol L and is defined by the dimensions of the parts of the web 74 which pass through the assembly gap 80. Therefore, in the web 73, the assembly gap only has the total length L through which parts of the other web 74 pass. The width of this assembly gap 80 is not constant.

In contrast, the other web 74 does not have any aperture at all which would be necessary for inserting the spring. Nevertheless, a corresponding assembly gap 82 of this other web 74 is likewise not constructed with a constant width. Instead, the width of the gap 82 only corresponds to the wall thickness of the web 73 at a few points, and widenings 84 of the assembly gap 82 are provided therebetween. Consequently, if corrosion layers form in the assembly gap 82, these can only lead to stresses and deformations at the few narrower points of this assembly gap. However, the stresses and deformations are compensated in the web, without an occurrence of macroscopic deformations and a growth in length of the web 74. Corresponding widenings 85 are also provided in the assembly gap 80 of the web 73 outside the apertures 78 and 79. Furthermore, FIG. 8 also shows that the parts of one web which are in each case introduced into an assembly gap of the other web carry lateral buttons 86. The lateral buttons 86 guide the other web and fix it laterally while the two webs are being assembled, until the soldering points, weld seams or other metallurgical connections are made.

Thus, an appreciable part of the growth in length of spacers can be prevented by the very shaping of the assembly gaps, without the structure or metallurgy of the spacer having to be modified.

Figure 9:
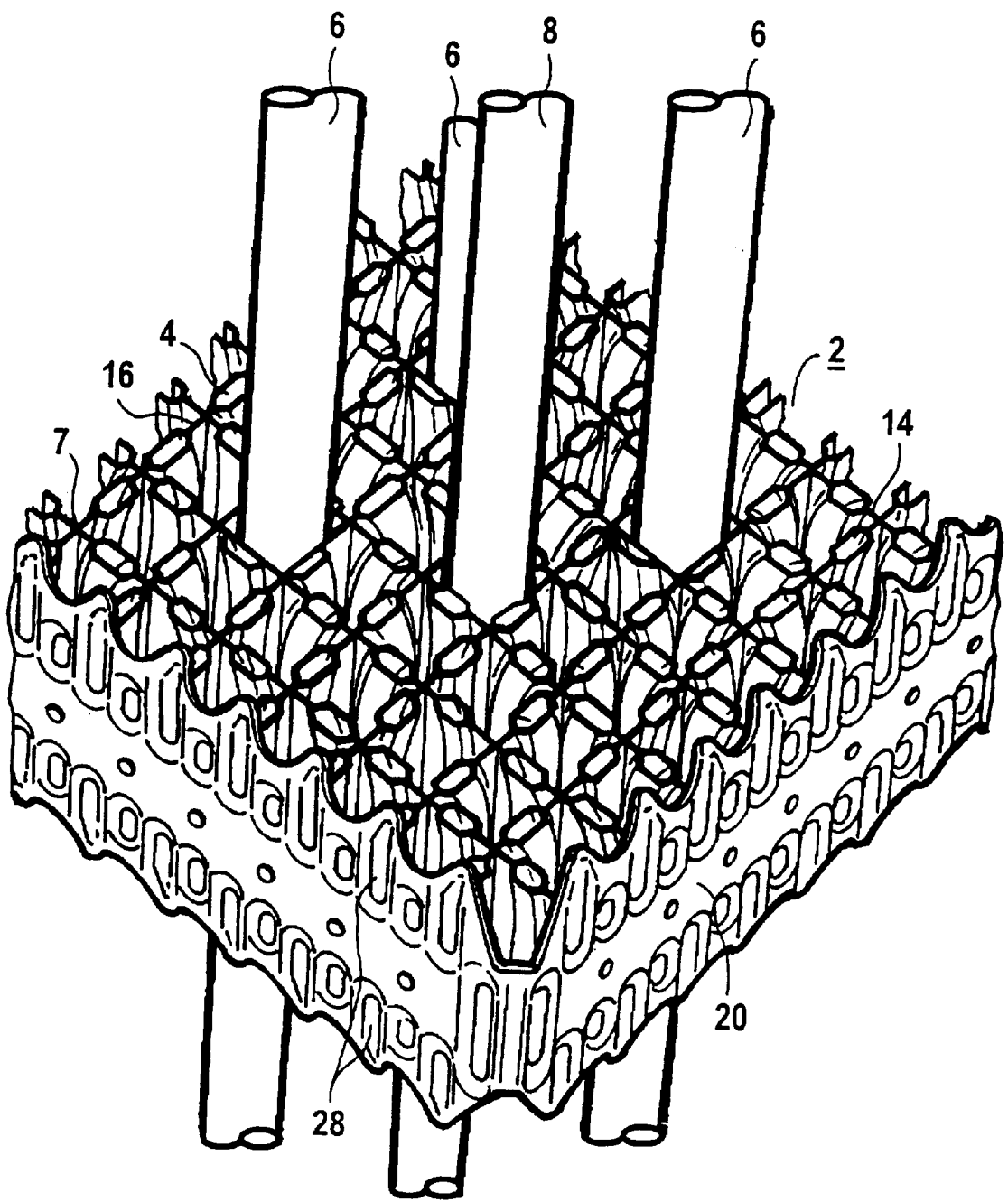
FIG. 9 is a fragmentary, perspective view showing a spacer matrix formed from intersecting webs and having an outer strip, wherein the webs include two web plates.
Figure 10:
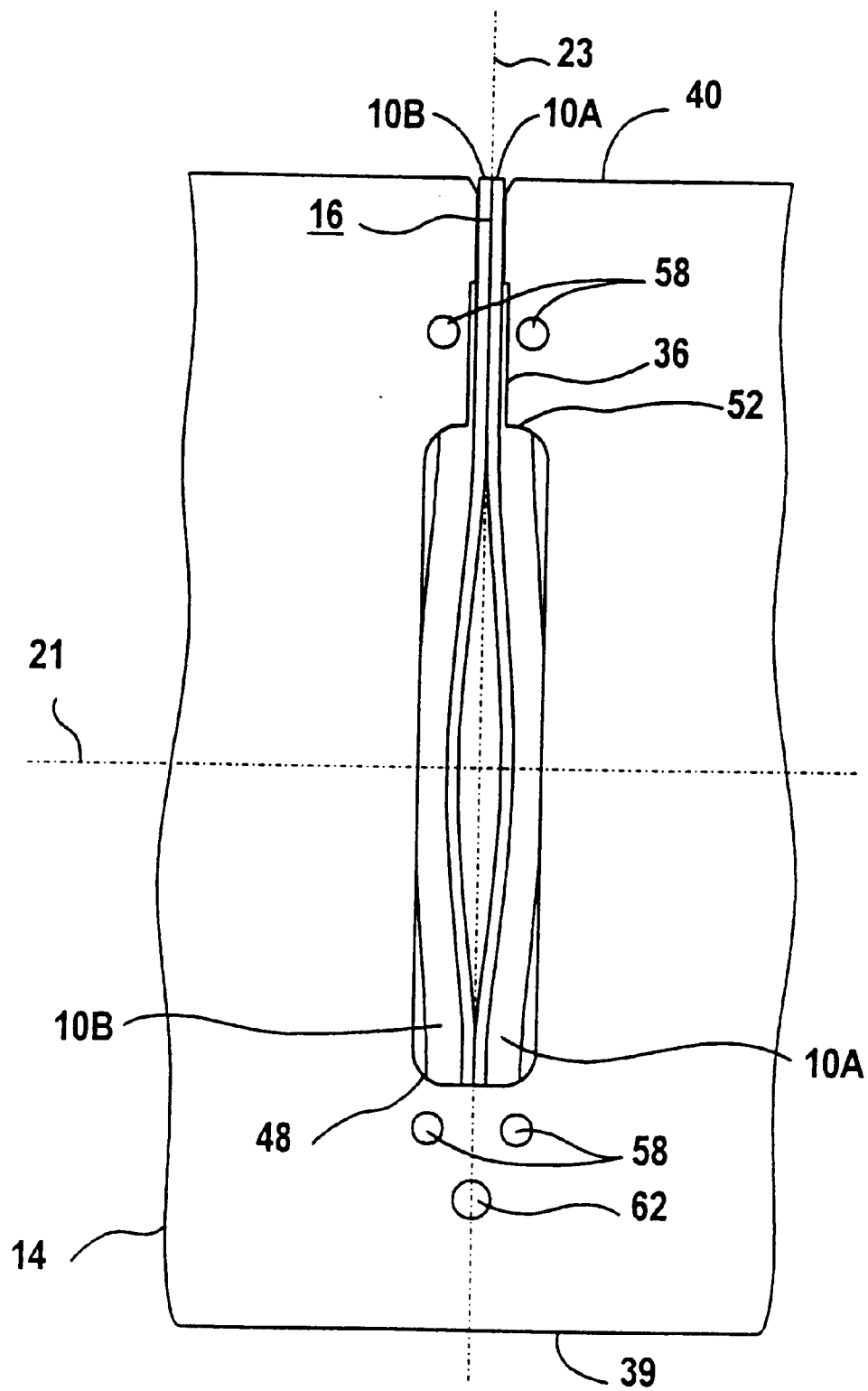
FIG. 10 is a fragmentary, elevational view showing a web including two web plates, with apertures disposed along an assembly axis.

FIG. 9 shows a portion of a spacer matrix 2 with intersecting webs 14, 16 which include two web plates 10A, 10B shown in FIG. 10. These spacers have proved particularly appropriate, especially in pressurized water reactors. The web plates 10A, 10B bear against one another at least in the vicinity of an intersection location 7 with an intersecting web. In a remaining region, the web plates 10A, 10B are deformed and/or bent relative to one another, so that flow ducts 4 are obtained therebetween. A fuel rod 8 or a guide tube 6 in each case projects through the cells of the spacer matrix. The webs 14, 16 are fastened to two respective outer strips through a fixing 28 similar to the latch and slot already explained with reference to FIG. 3.

FIG. 10 shows an embodiment of a web 14 of a spacer according to FIG. 9. Like the previous embodiments, this web 14 also has an assembly gap 36 which receives the intersecting web at an intersection location with an intersecting web 16. The intersecting web includes the two web plates 10A, 10B which bear against one another in the intersecting region and the common thickness of which at the intersection location corresponds to the wall thickness of the intersecting web. The assembly gap 36 has a width, only over a fraction of its total length through which parts of the other web pass, which corresponds essentially to the wall thickness of the intersecting web. In a remaining region, the assembly gap is so wide that the two intersecting webs 14, 16 do not touch one another.

In contrast to the embodiments of FIGS. 1 to 7, the assembly gap 36 has a mouth 52 which has an aperture 48 adjoining it. This aperture is substantially wider than the assembly gap 36 and extends beyond a web center indicated by a center axis 21 of the web. Such an aperture is preferably located in the two intersecting webs 14, 16. However, such an aperture may also be made only in one web 14 of the intersecting webs 14, 16. Through the use of the aperture 48, web locations which are in danger of corrosion are cut out. A plurality of apertures of various shapes are also possible at these locations in order to achieve the object of the invention.

Preferably, the web has at least one further aperture 50 disposed along an assembly axis 23 of each assembly gap 36. The apertures 48, 50 cut out web locations which are in particular danger of corrosion and which consequently bring about the longitudinal expansion of the web. Furthermore, the web 14 carries elevations 58 between which the intersecting web is held. These elevations are made on a web part which passes through the assembly gap of the other web. By virtue of the elevations, the inserting webs are held in a more stable manner should the webs not be supported sufficiently because of the presence of the apertures 48, 50, in particular while the spacer is being mounted prior to the metallurgical connection of the webs.

Figure 11:
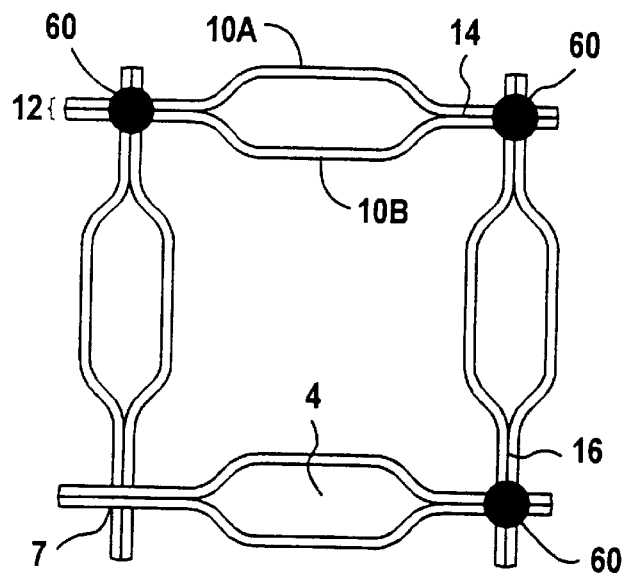
FIG. 11 is an elevational view showing a cell of a spacer matrix formed of two intersecting webs including web plates.

FIG. 11 shows a cell of a spacer 2. As already shown in FIG. 9, a web 14 of the spacer includes at least two web plates 10A, 10B bearing against one another at least in the vicinity or region of an intersection location 7. In order to form flow ducts 4, the web plates are bent/deformed relative to one another in a remaining region. In a similar way to the embodiment of a spacer 1 having webs 3 which include an individual web plate, in this case too, each web 14 is metallurgically connected to an intersecting web 16 through the use of at least one connection point 60. In this spacer embodiment, which is preferably used for pressurized water reactors, it is advantageous if both the intersecting webs 14, 16 and the web plates bearing against one another are metallurgically connected to one another in the region of the intersection location 7 through. the use of the metallurgical connection 60. It is advantageous, in particular, if the metallurgical connection extends to regions which are particularly susceptible to corrosion. These are, in particular, the regions of the assembly gaps which have essentially the width of the wall thickness of the intersecting web.

Figure 12:
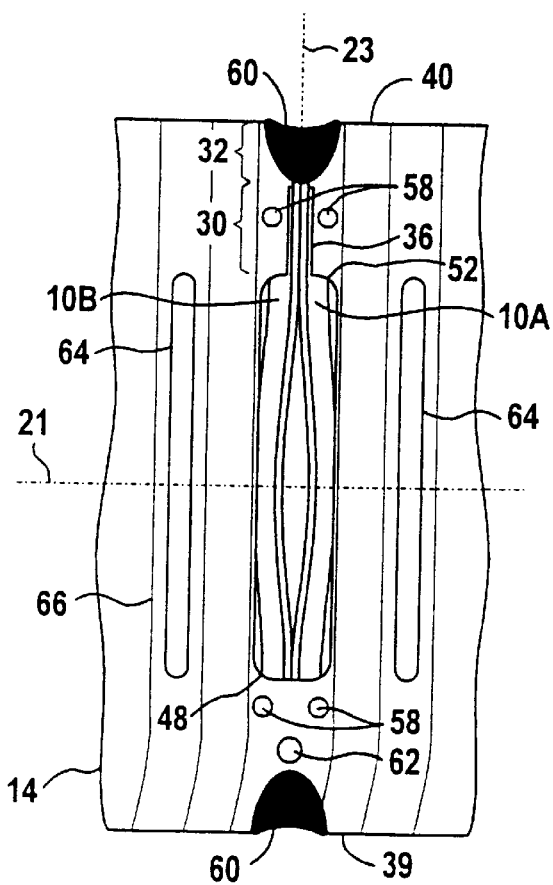
FIG. 12 is a fragmentary, elevational view showing a web according to FIG. 10 with a metallurgical connection of the intersecting webs which is made along the assembly gap.

Accordingly, FIG. 12 shows a portion of a web having an advantageous structure of metallurgical connections, in this case welded connections 60, 62, particularly for preventing corrosion at those locations of webs and assembly gaps in the spacer 2 which are in particular danger of corrosion. Furthermore, in this embodiment, the web plates of the upright web which bear against one another are in particular metallurgically connected to the intersecting web through the use of a connection location 60 at the upper edge 39 and at the lower edge 40 of the web. In addition, FIG. 12 essentially shows features which have already been explained with reference to FIG. 10. The web plates are connected to one another over a large area through the use of a further metallurgical connection 62, preferably a weld spot, in the region in which the web plates bear against one another over a large area. The weld spot 62 is advantageously applied at the location at which corrosion is particularly pronounced. This is often a location at which the web plates have relatively high radii of curvature. Alternatively to this embodiment, it is possible to make a recess 50 according to FIG. 10 at the same location. Furthermore, FIG. 12 shows that the welded connection in the region of the intersection location 7 of the intersecting webs is not limited only to the upper edge 39 or lower edge 40 of the intersecting webs.

In order to avoid longitudinal expansion, which occurs particularly as a result of corrosion in a narrow region 32 of each assembly gap 36, the welded connection 60 extends virtually along the entire length of that part 32 of the assembly gap 36 having a width which corresponds essentially to the wall thickness of the intersecting web. The elevations 58, which were already explained with reference to FIG. 10, are made in such a way that the respectively intersecting web is held between them. In this embodiment, flow ducts 66 serve in each case for cushioning the fuel rods 8 guided in the cells of the spacer matrix. In order to provide for the advantageous mounting of the fuel rods guided in the cells of the spacer matrix along two lines, in each case there is a recess 64 in the region of a respective flow duct 66. In each case the fuel rod bears against the edges of these recesses 64.

Figure 13:
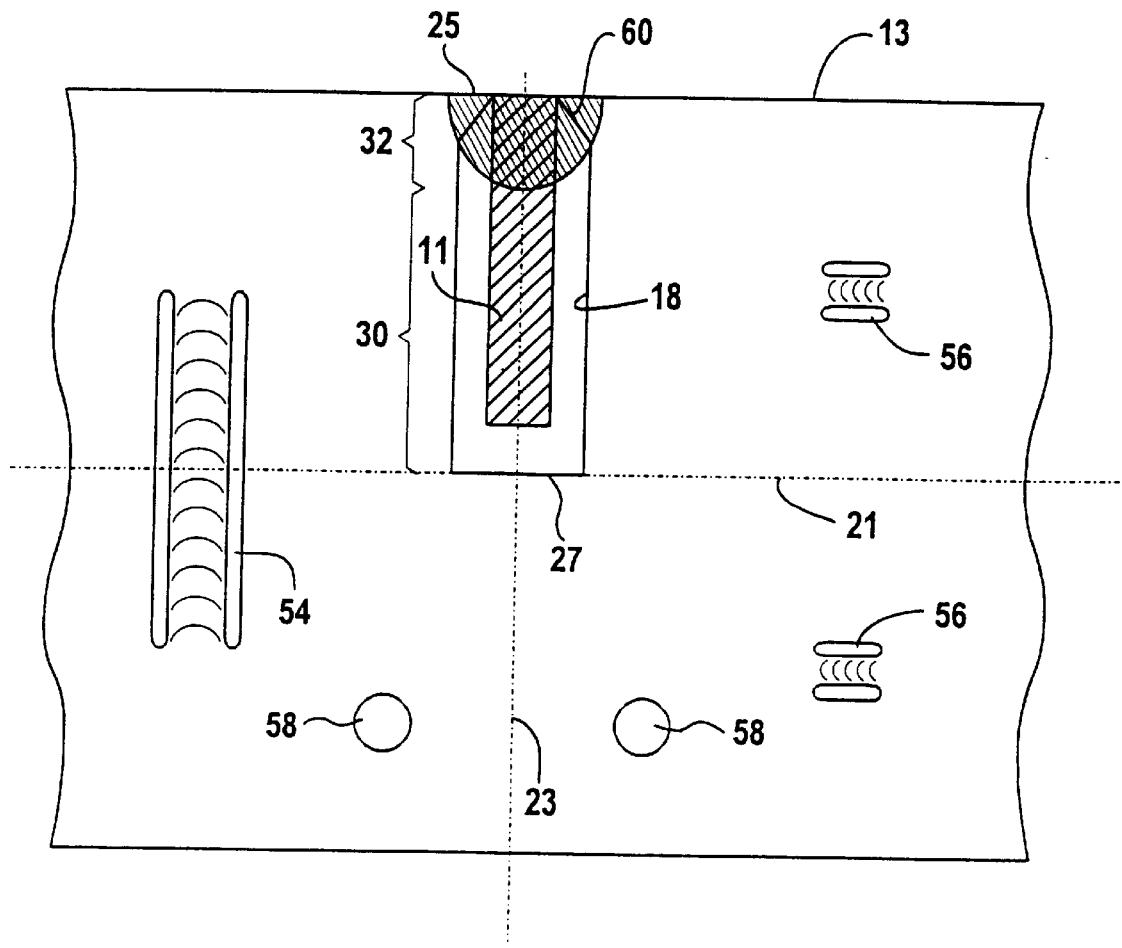
FIG. 13 is a fragmentary, elevational view showing a web with an assembly gap, which carries a metallurgical connection in one region and which, in another region, is wider than a wall thickness of th e intersecting web.

A particular embodiment of a web 13, which is further modified relative to the structures shown in FIGS. 4 to 8, is shown in FIG. 13. In this particular embodiment, an assembly gap 18 carries a metallurgical connection 60 of the intersecting webs 13, 11 in one region 32. In a further region 30, the assembly gap 18 is so wide that the two webs 11, 13 do not touch one another. In particular, the assembly gap 18 is also so long that the two webs 11, 13 do not touch one another. In order to provide for the cushioning of the fuel rods which pass through the cells of the spacer matrix, each web 13 carries at least one spring 54 stamped out of the web for each cell, and for the same purpose the web 13 also carries at least one pair of stamped-out rigid bosses 56.

In a similar way to the embodiment of a spacer 2 which has already been explained with reference to FIG. 12, in this embodiment of a spacer 1, 2 as well, the welded connection 60 in the region of an intersection location of the webs 11, 13 extends at least over that part of the assembly gap which corresponds essentially to the wall thickness of the intersecting web 11. Furthermore, in this embodiment, the intersecting web 11 is held between two elevations 58 of the other web 13.

We claim:

1. A spacer for a fuel assembly of a nuclear power station, comprising:
   webs disposed in a grid defining intersection locations, each of said webs having a wall thickness and having an assembly gap receiving an intersecting web at one of said intersection locations;
   said assembly gap in each of said webs having regions through which parts of the other of said webs pass in said intersection location of two webs, at least two of said regions having different widths; and
   said assembly gap in each of said webs having a total length formed by said regions through which the parts of the other of said webs pass in said intersection location of two webs, at most a fraction of said total length having a width substantially corresponding to said wall thickness of the other of said webs, each of said webs being metallurgically connected to the other of said webs virtually entirely along said fraction of said total length of each assembly gap.

2. The spacer according to claim 1, wherein each assembly gap has a narrowest cross section, and each web has a recess adjacent each assembly gap on both sides of each assembly gap in the vicinity of said narrowest cross section.

3. The spacer according to claim 1, wherein each assembly gap has an assembly axis, and each web has at least one aperture disposed along said assembly axis.

4. The spacer according to claim 3, wherein each assembly gap opens into at least one of said apertures.

5. The spacer according to claim 1, wherein two of said webs are metallurgically connected to one another at least at one connection point.

6. The spacer according to claim 1, wherein each web includes at least two web plates bearing against one another at least in the vicinity of one of said intersection locations with an intersecting web, and said at least two web plates have a combined thickness corresponding to said wall thickness of said web at said intersection location.

7. The spacer according to claim 6, wherein said web plates bearing against one another are metallurgically connected to one another in the vicinity of said intersection location.

8. The spacer according to claim 6, wherein said web plates bearing against one another are metallurgically connected to said intersecting web at least at one connection location and are connected to one another a really at least at one further connection location.

9. The spacer according to claim 8, wherein said at least one further connection location is in a region in which said web plates bear against one other.

10. The spacer according to claim 1, wherein each web has a part passing through said assembly gap of the other web and two elevations on said part, between which the other web is held.

11. A spacer for a fuel assembly of a nuclear power station, comprising:
    webs disposed in a grid defining intersection locations, each of said webs having an assembly gap receiving an intersecting web at one of said intersection locations;
    each assembly gap of each web including:

at least one of first regions having a metallurgical connection of two webs in said intersection location of two webs, each of said first regions having an entire length and closed virtually along said entire length by said metallurgical connection; and at least one of second regions in said intersection location of two webs through which part of another web passes, said second regions having a width sufficient to prevent two webs from touching, said another web passing only said first regions and said second regions of said assembly gap.

12. The spacer according to claim 11, wherein each web has a part passing through said assembly gap of the other web, and said part has at least two elevations between which the other web is held.

13. A spacer for a fuel assembly of a nuclear power station, comprising:

two mutually parallel first outer strips;

two mutually parallel second outer strips perpendicularly to said first outer strips;

first webs standing on edge, parallel to said first outer strips and having ends each engaging into and fixed to a respective one of said outer strips;

second webs standing on edge, parallel to said second outer strips, intersecting said first webs and having ends each engaging into and fixed to a respective one of said outer strips;

said first webs each having an upper edge and a lower edge, said upper edges running from one of said outer strips to another of said outer strips and each having an assembly gap at an intersection location with a respective one of said second webs, said assembly gap directed toward said lower edge and receiving part of an intersecting one of said second webs;

said second webs each having an upper edge and a lower edge, said lower edges each having an assembly gap at an intersection location with a respective one of said first webs, said assembly gap directed toward said upper edge and receiving part of an intersecting one of said first webs;

each of said assembly gaps having at least one of first gap regions and at least one of second gap regions, each of said first gap regions having an entire length and closed virtually along said entire length by a metallurgical connection of one web with an intersecting web;

part of said intersecting web passing through each of said second gap regions; and one of said first gap regions located at one of said edges and each of said second gap regions wide enough to prevent two of said webs from touching.

* * * * *

UNITED STATES PATENT AND TRADEMARK OFFICE
CERTIFICATE OF CORRECTION

PATENT NO.    : 6,320,925 B1
DATED         : November 20, 2001
INVENTOR(S)   : Reiner Manzel et al.

It is certified that error appears in the above-identified patent and that said Letters Patent is hereby corrected as shown below:

<u>Title page,</u>
Item [54] should read as follows:

-- SPACER FOR A FUEL ASSEMBLY OF A NUCLEAR POWER STATION --

Signed and Sealed this

Twenty-fifth Day of June, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,320,925 B1
DATED : November 20, 2001
INVENTOR(S) : Reiner Manzel et al.

It is certified that error appears in the above-identified patent and that said Letters Patent is hereby corrected as shown below:

<u>Column 12,</u>
Lines 15-18, should read as follows:
-- said assembly gap in each of said webs having regions through which parts of the other of said webs pass in said intersection location of two webs, at least two of said regions having different widths; at least one of the said regions wide enough to prevent intersecting ones of said webs from touching; and --

Signed and Sealed this

Twentieth Day of May, 2003

JAMES E. ROGAN
*Director of the United States Patent and Trademark Office*